Patented Aug. 25, 1936

2,052,139

UNITED STATES PATENT OFFICE 2,052,139

FABRICATED STRUCTURE AND METHOD OF MAKING THE SAME

Herbert C. Jennison, Bridgeport, Conn., assignor to The American Brass Company, Waterbury, Conn., a corporation of Connecticut No Drawing. Application September 21, 1931, Serial No. 564,139

6 Claims. (Cl. 113—112)

This invention relates to fabricated structures and the method of making the same, whereby individual parts, comprising regular or irregular shapes, such as extruded, rolled or drawn shapes, moldings and so forth for architectural work, are welded together.

At the present time it is common to use alloys such as brass, for moldings, window frames, and similar shapes for architectural and like purposes which are ordinarily rolled, extruded or drawn, and at the joints they are ordinarily connected by soldering with a silver or a similar solder, or riveted, as it has been impossible to make satisfactory welds with these brass shapes. Welded joints are desirable as the soldered and riveted joints are not nearly as sightly or as strong as would be a satisfactory welded joint. It is therefore an object of this invention to produce an alloy which can be readily worked and hot rolled, extruded or drawn into these shapes and also cold rolled or drawn, and can be readily welded at the joints so as to do away with the necessity of soldering or riveting, and much better joints can be produced.

I have found that by the addition of a sufficient amount of manganese to a copper-zinc alloy containing from about 50% to about 70% copper to produce a copper, zinc, manganese alloy the welding properties are tremendously increased, that the welds can be easily made, are dense and homogeneous, and when ground off and polished the weld is practically indistinguishable from the remainder of the base metal. Also that the strength of the weld is practically the same as the base metal of the elements welded.

The preferred alloy comprises approximately 57.50 percent copper, 42.00 percent zinc and 0.50 percent manganese, and I have found that shapes made from this alloy can be readily welded, and that the welds are strong, dense and uniform. I have also found that this alloy can be readily worked and readily hot rolled or extruded into irregular and regular shapes, and can also be cold rolled or drawn into various shapes. The material can be used for all architectural purposes, such as door fronts, building fronts, window frames, moldings and similar work. These shapes made of this alloy are particularly adapted for building, architectural, and similar purposes where it is desired that the joints be made by welding, especially autogenous welding. By autogenous welding I mean welding in which the metal of the weld is of substantially the same constituency or composition as the base metal of the members welded together whether or not additional metal is added from a welding or filler rod, and whether the welding is done with a gas rod or blow torch, by electric arc, or other source of heat.

It has been found that in this copper, zinc, manganese alloy the welding properties have been increased tremendously over the copper-zinc alloy. The weld has a tensile strength almost equal to that of the base metal. The weld is also very sound and homogeneous, and the metal welds readily so that the joints can be easily and readily made. The manganese reduces the volatilization of the zinc in the base metal during the welding operation so that the composition at the weld is not materially changed, and it does not choke the welder during the welding. If the manganese were not present the loss of zinc would be very high especially in making autogenous welds. After the weld has been made, ground and polished, it is practically impossible to detect it.

It is particularly pointed out that the manganese reduces the porosity of the metal and increases its strength giving strong dense welds, and as it inhibits the volatilization of the zinc during the welding operation the composition of the weld is practically the same as that of the base metal so that it is as strong and of the same appearance as the base metal. This would not be true where there is material volatilization or loss of zinc during the welding operation as it will be evident in such event the composition of the metal of the weld would be materially different from that of the base metal, giving a weld which is easily distinguished from the base metal and which may not be as strong.

Another feature is that the working of this alloy greatly reduces the porosity of the metal. It has been found in practice as indicated that structures fabricated of members made of this worked alloy and welded by additional metal from a rod of the same constituency are of strong uniform constituency throughout, with welds that cannot be distinguished from the base metal.

Although an alloy having approximately the above noted proportions has proven very satisfactory as having improved properties for welding, I am not limited thereto, as the proportions of the various metals may be varied considerably without losing this adaptability for welding. The amount of manganese is preferably below 1.00 percent, and from about 0.10 percent up to about 1.00 percent. The copper may vary from about 50.00 percent to about 70.00 percent, the manganese from about 0.01 percent to about 5.00 percent and the balance zinc, although with the higher percentages of manganese the alloy may not work quite as readily in the mill.

This alloy is also very adaptable for use as a welding rod for welding other metals as well as this particular alloy. The welding properties of this alloy are not materially changed by the additions of small amounts of other elements, and therefore the additions of small amounts of these elements would not materially change the adaptability of this alloy for the purposes intended.

In short this alloy makes a strong, dense, homogeneous and very beautiful weld. It also welds easily, and does not choke the men during the welding operation.

Having thus set forth the nature of my invention, what I claim is:

1. A fabricated structure comprising a plurality of members composed of an alloy of from 50% to 70% copper, from 0.01% to 5% manganese and balance zinc worked into shaped members, and welded together to form the structure, the metal of the welds being of substantially the same constituency as the base metal of the welded members.

2. A fabricated structure comprising a plurality of members composed of an alloy of from 50% to 70% copper, from 0.10% to 1.0% manganese and balance zinc worked into shaped members, and welded together to form the structure, the metal of the welds being of substantially the same constituency as the base metal of the welded members.

3. A fabricated structure comprising a plurality of members composed of an alloy of approximately 57.5% copper, 42% zinc and 0.5% manganese worked into shaped members and welded together to form the structure, the metal of the welds being of substantially the same constituency as the base metal of the welded members.

4. A method of making a fabricated structure comprising working an alloy composed of from 50% to 70% copper, from 0.01% to 5% manganese and balance zinc, and forming the worked alloy into shaped members, placing the members adjacent each other, and welding the adjacent members together by autogenous welding of the adjacent surfaces so that the metal of the weld is of substantially the same constituency as the base metal of the welded members.

5. A method of making a fabricated structure comprising working an alloy composed of from 50% to 70% copper, from 0.10% to 1.0% manganese and balance zinc, and forming the worked alloy into shaped members, placing the members adjacent each other, and welding the adjacent members together by autogenous welding of the adjacent surfaces so that the metal of the welds is of substantially the same constituency as the base metal of the welded members.

6. A method of making a fabricated structure comprising working an alloy composed of approximately 57.5% copper, 42% zinc, and 0.5% manganese, and forming the worked alloy into shaped members, placing the members adjacent each other, and welding the adjacent members together by autogenous welding of the adjacent surfaces so that the metal of the welds is of substantially the same constituency as the base metal of the welded members.

HERBERT C. JENNISON.